United States Patent [19]
Gasperini

[11] 4,292,662
[45] Sep. 29, 1981

[54] PHOTOGRAPHIC EXPOSURE CHAMBER

[76] Inventor: Eugene Gasperini, 110 W. Foster Ave., Bensenville, Ill. 60106

[21] Appl. No.: 74,395

[22] Filed: Sep. 10, 1979

[51] Int. Cl.³ .............................................. G03B 15/02
[52] U.S. Cl. ...................................... 362/17; 362/18; 362/367; 362/373; 362/294
[58] Field of Search ................... 362/17, 18, 294, 367, 362/373

[56] References Cited
U.S. PATENT DOCUMENTS 3,643,085  2/1972  Durand ............................... 362/16

*Primary Examiner*—Stephen J. Lechert, Jr.
*Attorney, Agent, or Firm*—Laff, Whitesel & Rockman

[57] ABSTRACT

An integrally constructed light stage is formed with a chamber having three translucent and interior reflective panels and a light reflective unit forming the back and floor. Hoods with light reflective interior surfaces cover the panels. Light sources are positioned between the hoods and panels and, if desired, beneath the floor. The object to be illuminated is placed within the chamber, usually on the floor. The light sources can then be activated as desired illuminating the object in a carefully controlled manner.

7 Claims, 9 Drawing Figures

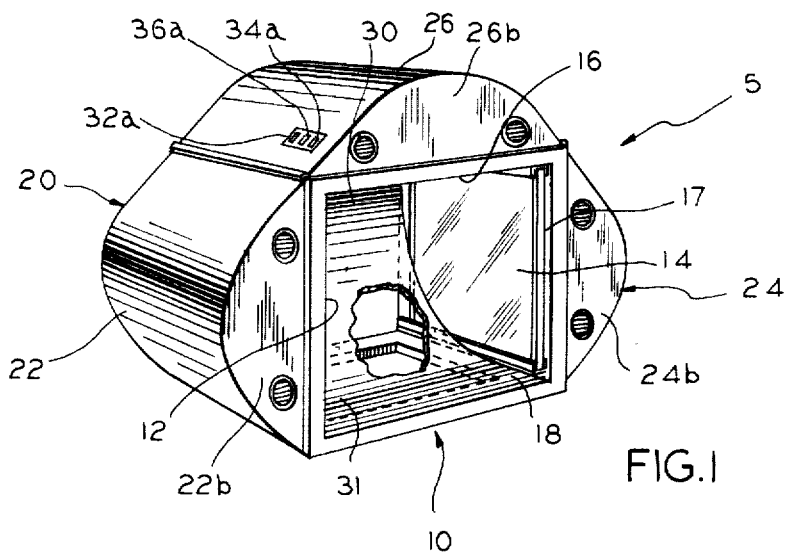
FIG. 1
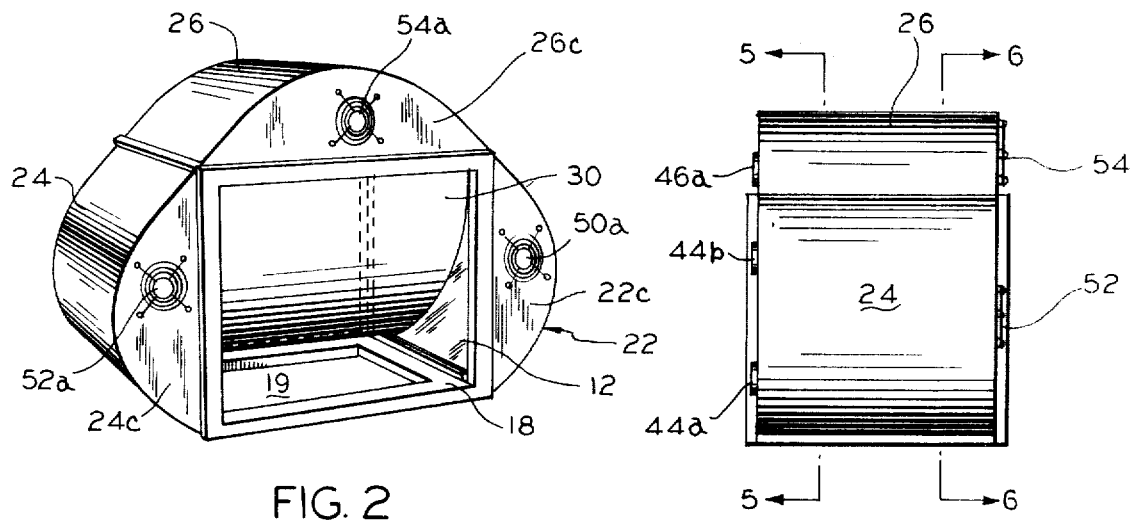
FIG. 2
FIG. 3
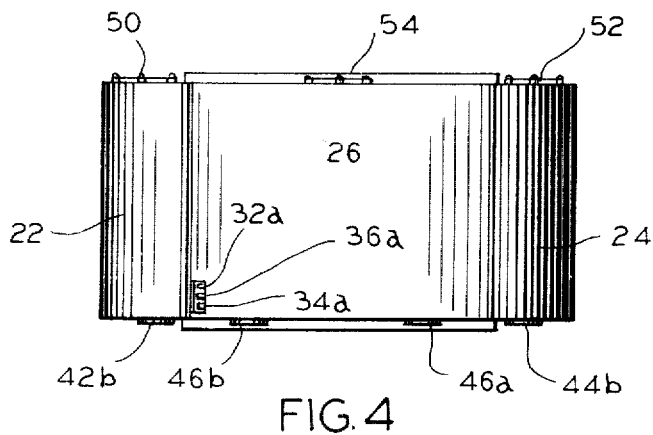
FIG. 4

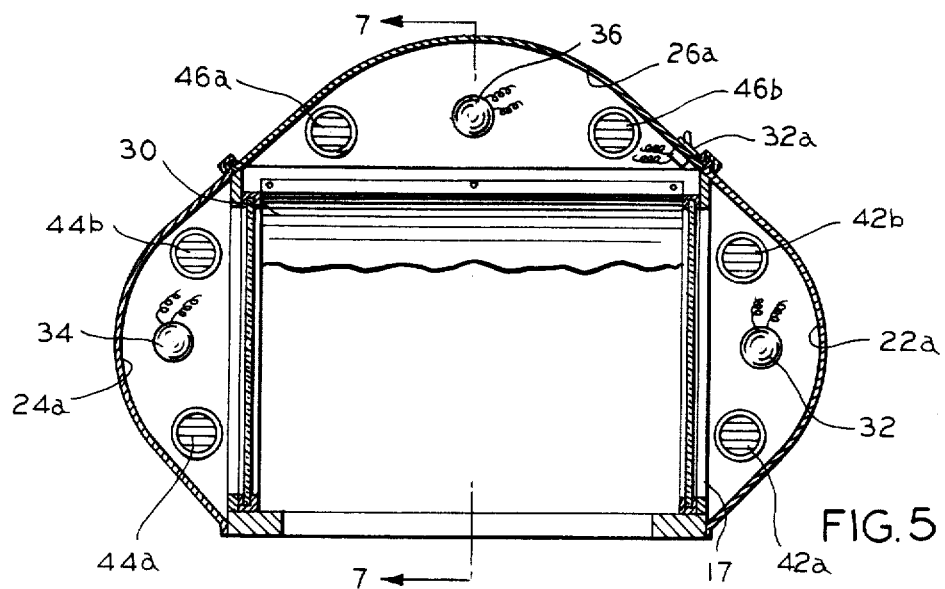
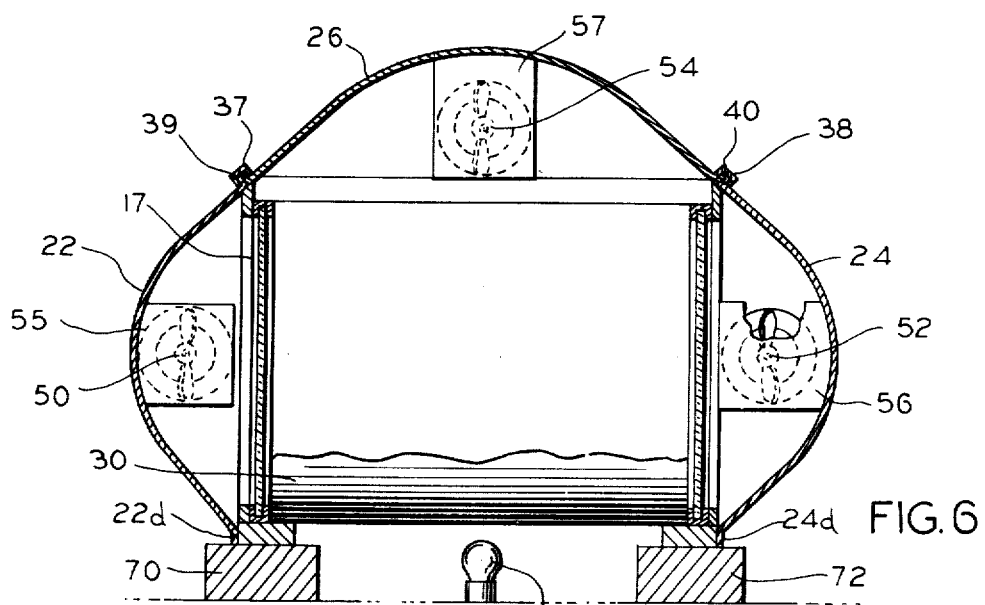
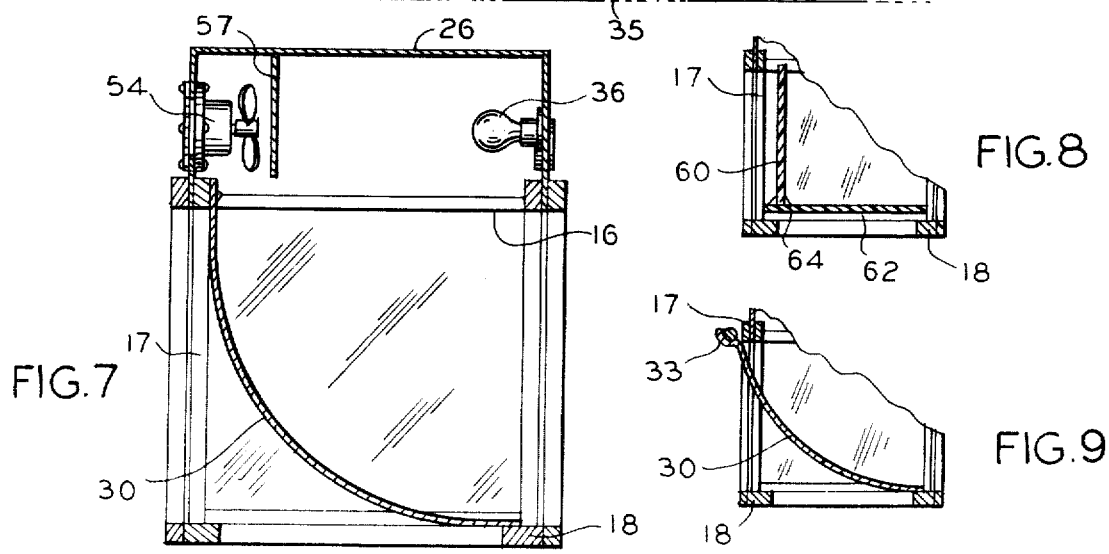

PHOTOGRAPHIC EXPOSURE CHAMBER

BACKGROUND OF THE INVENTION

This invention relates to a light stage or chamber wherein objects to be photographed can be placed and receive controlled illumination.

Photographers, and particularly commercial photographers, must often be able to control the lighting conditions surrounding the object which is to be photographed. When a commercial photographer is taking pictures to be used in a catalog or advertisement, one of the most difficult and time consuming aspects of the job is to insure that the lighting conditions are such that the object to be photographed is displayed in the best possible manner. If a change in the lighting conditions is required for a different subject or effect, the lighting changes must be made easily and efficiently.

In the past, a photographer would often choose to construct what is commonly referred to as a "light tent". This usually required the installation and positioning of several separate, large, balky screens surrounding the object to be photographed, with lights suspended from the ceiling of the studio or mounted on stands as, for example, shown in U.S. Pat. No. 523,323 and U.S. Pat. No. 384,151. These arrangements not only require a great deal of time and expertise to assemble, but also the resulting photograph usually requires extensive "touch up" or "air brushing" to remove undesirable shadows and shadow lines. These undesirable features result from uneven lighting within the tent, particularly at the junctions between the screens and with the floor. This means loss of valuable time and money to a commercial photographer.

Other assemblies used to produce controlled illumination are either too clumsy to use and modify or too inefficient with respect to the amount of light required, such as that disclosed in U.S. Pat. No. 1,447,475, or do not provide the complete flexibility with respect to background scenery or equal illumination on all sides, such as that device disclosed in U.S. Pat. No. 3,643,085. Furthermore, with many of these light tents, the common use of incandescent light sources within the enclosed tent creates an accumulation of heat which hinders and sometimes precludes continuous work for long periods of time.

Thus, there is a need for and it is an object of this invention to provide a portable, integrally constructed apparatus which provides easily controlled lighting conditions and maximizes lighting efficiency. It is a further object of this invention to provide a lighting apparatus wherein a variety of background scenes can be used behind the object to be photographed with a minimum of assembly time. Yet another object of the invention is to provide an apparatus which provides equal illumination of the object to be photographed such that even a novice photographer can produce a shadowless photograph which requires little or no touch up.

SUMMARY OF THE INVENTION

In keeping with one aspect of this invention, a light stage or chamber is constructed with three translucent and interior reflective panels and a reflective unit forming the back and floor. One of the panels serves as a ceiling for the chamber, while the other two panels form the sides. Hoods with light reflective interior surfaces cover the panels. Light sources positioned between the panels and hoods provide illumination to the interior of the chamber. The back and floor of the chamber are light reflective and may be either separate panels or an integral, curved surface. The object to be illuminated is placed within the chamber, usually on the floor.

The above mentioned and other features of this invention and the manner of obtaining them will become more apparent, and the invention itself will be best understood by reference to the following description of embodiments of the invention taken in conjunction with the accompanying drawings.

BRIEF DESCRIPTION OF THE DRAWINGS

FIG. 1 is a front perspective view of the invention with a portion of the sweep cut away.

FIG. 2 is a rear perspective view of the invention.

FIG. 3 is a side elevation view of the invention.

FIG. 4 is a top plan view of the invention.

FIG. 5 is a cross sectional view of the invention taken along line 5—5 of FIG. 3.

FIG. 6 is a cross sectional view of the invention taken along line 6—6 of FIG. 3.

FIG. 7 is a cross sectional view of the invention taken along line 7—7 of FIG. 5.

FIG. 8 is a partial cross sectional view of an alternate embodiment of the invention.

FIG. 9 is a partial cross sectional view of another alternate embodiment of the invention.

DETAILED DESCRIPTION OF THE INVENTION

As shown in FIGS. 1-7, a photographic exposure chamber 5 constructed in accordance with the teachings of this invention comprises an inner shell 10 and an outer shell 20. Preferably, the inner shell 10 is a box-like chamber which includes three panels 12, 14, and 16 secured within a skeleton or framework 17 generally defining a box. Panel 16 actually forms the ceiling of the inner shell above side panels 12 and 14. These panels are translucent and desirably constructed with a frame of wood, aluminum, or other relatively rigid material and a sheet of light diffusive material stretched across the frame. The inside surface of this material is light colored and reflective. The front of the chamber is open-faced and unobstructed to provide access to the interior.

As shown best in FIGS. 1 and 2, the back and floor of the inner shell is an integral, light reflective surface or sweep 30, such as white paper, plastic or Plexiglas, which is secured to the ceiling framework and slopes down from ceiling 16 along the back of panels 12 and 14 and then curves to form a horizontal floor 31 between them and below ceiling 16. For certain lighting conditions, e.g., if underneath lighting is desired, translucent plastic or Plexiglas should be used as sweep 30. For other lighting conditions, e.g., where some shadows are desired, white paper is preferable as sweep 30. When paper is used as the sweep, a roll 33 of paper is rotably mounted along the outside and back of framework 17 near the ceiling as shown in FIG. 9. The paper sweep 30 can then be extended or retracted as desired.

Beneath the floor, a base 18 is used. The base 18 is also preferably composed of wood or a rigid material designed to give support to panels 12 and 14 and, when necessary, to sweep 30. The base includes an aperture 19 to permit light from a source beneath the chamber to reach the interior of the chamber if desired.

The outer shell 20 is formed by three hoods or cover sections 22, 24, and 26. The hoods cover the outside surfaces of panels 12, 14, and 16, respectively, and are secured to each other by slides 37 and 38. As best shown in FIGS. 5 and 6, slides 37 and 38 engage pairs of lips 39 and 40 provided by and extending along the junction of hoods 22, 24 and 26. Hoods 22 and 24 are secured along their lower edges 22d and 24d to framework 17 by any suitable means, such as a nut and bolt. The hoods are preferably made of a light rigid material such as Masonite or plastic. One such plastic found suitable for this purpose is Abex 821FR, also known as Abson, a product of Futurex Incorporated of Bloomingdale, Ind. The interior surfaces 22a, 24a and 26a of the hoods are light colored so as to maximize light reflection.

As shown in FIGS. 3, 5, and 7, light sources 32, 34, and 36 are placed between the corresponding pairs of panels and hoods 12-22, 14-24 and 16-26, respectively. Each source is desirably one or more incandescent bulbs suitably wired to and independently operable by switches 32a, 34a, and 36a, respectively, and by a suitable electric power source. The bulbs are shown mounted directly to the interior surface of the hoods, but they can also be clamped on supports (not shown) which extend approximately parallel to panels 12, 14 and 16 within hoods 22, 24 and 26. If the bulbs are clamped on supports, the bulbs can be moved along the length of the supports to allow flexibility in positioning the light. Generally, it has been found most desirable to locate the bulbs centrally between the panels and hoods. An additional light source 35 can be placed beneath base 18, which can be elevated by any suitable means such as blocks 70 and 72, to provide underneath lighting through opening 19 for the interior of chamber 5 if desired.

The cavities formed between the internal walls and hoods may develop excessive and undesirable heating, particularly if incandescent bulbs are used as light sources. Therefore, as shown in FIGS. 5-7, the apparatus is also provided with vents 42a, 42b, 44a, 44b, 46a, and 46b located in the front portions 22b, 24b and 26b of hoods 22, 24 and 26, respectively, and with fans 50, 52, and 54 located between the panels and hoods. The fans may be mounted along the rear portions 22c, 24c, and 26c of hoods 22, 24, and 26, respectively. The fans withdraw the heat and remove it through openings 50a, 52a, and 54a in the rear portions of hoods 22, 24 and 26, respectively. These fans may be connected to the same power source as the bulbs and controlled by switches 32a, 34a, and 36a. For esthetic purposes, walls 55, 56, and 57 are secured to the interior surfaces of hoods 22, 24, and 26 behind fans 50, 52, and 54, respectively, to shield the interior view of the device from the outside observer.

It has been found that the most practical dimensions for the inner shell are between 24 and 48 inches deep, 25 and 50 inches wide, and 20 and 40 inches high. The hoods correspond in length and width to the panels and are preferably about 8 inches deep at their deepest point. These dimensions will produce a chamber which can be used on a table top or on the floor and will accommodate most objects to be photographed by a commercial photographer.

The chamber is easy and efficient to use. The object to be photographed is placed on the floor of the chamber and all or any one of the desired light sources and fans can be activated. The curvature and the interior reflective surface of the hoods tend to focus the light toward the object. If the sweep 30 forming the back and floor of the chamber is also translucent, and if all of the light sources including the underneath light source are activated, the object will be evenly illuminated. The resulting photograph will be virtually shadowless and require little or no touch up, even if a novice photographer takes the photograph. If slight shadows at the bottom of the object to be photographed are preferred, a solid base is used with the sweep 30 (which now can be opaque white paper). Again, however, the noticeable shadow lines formed at the edges and corners of previously used "light tents" are absent. Furthermore, these lighting conditions can easily be recreated with other objects and from one day to the next because the chamber need not be substantially disassembled and then reassembled. Equally important, the photographer can shoot photographs of the same or different objects all day long without a disruptive accumulation of heat from the light sources.

Sometimes special lighting effects are desired. Again, however, the lighting can be controlled by merely moving or deactivating one or more of the light sources; the chamber itself need not be disturbed unless a background scene is required. If a background scene is required, a slightly different embodiment shown in FIG. 8 is used. The sweep 30 which forms the back and floor is removed and a rear wall 60 and a floor 62 are installed. The rear wall 60 is a screen designed for rear projection and is supported vertically by any suitable means, such as a pair of props 64 and 66 (not shown) attached at the bottom of the rear wall. In this embodiment, the rear wall 60, like panels 12, 14, and 16, may be a wooden frame covered by light diffusive sheeting. The floor may be a piece of light colored cardboard, wood, or plastic which rests on the base. The props and rear wall, in turn, rest on the floor at a 90% angle thereto. A scene displayed on film or a slide can be projected onto the rear wall from behind the chamber so that the scene appears within the chamber. The rear wall can be moved forward or backward within the chamber along the floor, as desired.

The many advantages of this photographic exposure chamber are self-apparent. First, the apparatus is portable and yet of unitary construction. Second, the lighting effects can be easily controlled and adjusted by the photograher and can be recreated with little or no disassembly required. Third, even illumination can be achieved with a minimum of light sources and heat buildup, thereby producing high quality photographs with no touch up required. Of course, there are still other advantages which will be apparent to those skilled in the art.

While this invention has been primarily described in terms of a photographic apparatus, it is a light stage suitable for illuminating objects for any purpose, such as commercial displays or for housing works of art. Thus, the description has been made only by way of example and the scope of the invention is not limited to use as a photographic exposure chamber.

I claim:

1. A portable light stage comprising: an open-faced chamber, said chamber having a floor, a ceiling and sides which are translucent and interior reflective; a plurality of curved hoods, each hood covering a side and the ceiling of said chamber, said hoods having interior light reflective surfaces; an independently operable light source positioned within each of said hoods and between said hoods and said chamber whereby an object placed within said chamber can be illuminated or placed in shadows from above, behind, or from the sides as desired.

2. The light stage of claim 1 wherein said chamber comprises: a rigid skeleton; a plurality of panels set within said skeleton forming the sides and ceiling of said chamber; and a reflective unit forming the back and floor of said chamber.

3. The light stage of claim 2 wherein said reflective unit is an integral, curved surface and wherein said stage includes a centrally apertured base beneath said reflective unit and a light source positioned adjacent said aperture to illuminate the object in the chamber from below.

4. The light stage of claim 2 wherein said reflective unit comprises a floor and a rear projection screen positioned at approximately a right angle to said floor, whereby said screen is movable along said floor and can be used to project from the rear background scenes for display within said chamber.

5. The light stage of claim 2 wherein each of said panels comprise a rigid frame covered with light diffusive sheeting.

6. The light stage of claim 1 including fans located between said chamber and hoods, means for providing power to operate said fans, and vents in said hoods for dissipating excess heat emanating from said light sources.

7. A portable photograhic exposure chamber comprising: an integrally constructed box-shaped inner shell, said shell having a translucent surface which is interior reflective and a frontal opening providing easy access to the interior; an outer shell affixed to said inner shell, said outer shell having curved light reflective interior surfaces above and on the sides of said inner shell; and light sources positioned between said inner and outer shells, whereby an object to be photograhed can be placed within said inner shell and receive equal or unequal illumination on its sides and from above as desired.

* * * * *